(12) United States Patent
Geesaman

(10) Patent No.: US 8,667,701 B1
(45) Date of Patent: Mar. 11, 2014

(54) TEMPLATE TOOL FOR LOCATING SITES FOR FIXING SHELF MOUNTING HARDWARE TO WALLS

(76) Inventor: Kenneth Geesaman, Penfield, NY (US)

( * ) Notice: Subject to any disclaimer, the term of this patent is extended or adjusted under 35 U.S.C. 154(b) by 120 days.

(21) Appl. No.: 13/345,711

(22) Filed: Jan. 8, 2012

Related U.S. Application Data

(60) Provisional application No. 61/460,798, filed on Jan. 7, 2011.

(51) Int. Cl.
*G01B 3/14* (2006.01)

(52) U.S. Cl.
USPC .................................. 33/613; 33/474; 33/562

(58) Field of Classification Search
USPC .......................... 33/404, 474, 562, 613, 645
See application file for complete search history.

(56) References Cited

U.S. PATENT DOCUMENTS

| | | | |
|---|---|---|---|
| 3,996,717 A * | 12/1976 | Sallenave et al. ............... 33/404 |
| 4,549,712 A | 10/1985 | Simon et al. |
| 4,700,489 A | 10/1987 | Vasile |
| 5,222,303 A | 6/1993 | Jardine |
| 5,269,066 A | 12/1993 | Walters |
| D349,462 S | 8/1994 | Douglas |
| D353,111 S | 12/1994 | Meador |
| 5,575,444 A | 11/1996 | Otema |
| 6,029,362 A | 2/2000 | Miodragovic |
| 6,101,729 A * | 8/2000 | Stringari ........................ 33/474 |
| 6,289,594 B1 * | 9/2001 | Wrobbel ........................ 33/474 |
| 6,314,652 B1 | 11/2001 | English |
| 6,336,274 B1 * | 1/2002 | Ness Webster ................. 33/474 |
| 6,338,204 B1 | 1/2002 | Howle |
| 6,357,609 B1 | 3/2002 | Van Noord et al. |
| 6,449,855 B1 * | 9/2002 | Louis ............................. 33/474 |
| 6,810,598 B2 | 11/2004 | Boys |
| 6,996,911 B1 | 2/2006 | Dinius |
| 7,222,437 B2 | 5/2007 | Spanski et al. |
| 7,316,073 B2 | 1/2008 | Murray |
| 7,513,056 B1 | 4/2009 | Hobden et al. |
| 8,312,634 B1 * | 11/2012 | Forsyth ........................ 33/562 |
| 2002/0170189 A1 * | 11/2002 | Cheatham ..................... 33/464 |
| 2008/0141546 A1 | 6/2008 | Strutt et al. |
| 2008/0189967 A1 | 8/2008 | Tosa |
| 2008/0222908 A1 * | 9/2008 | Bittner et al. ................. 33/404 |
| 2010/0083519 A1 * | 4/2010 | Bradley ....................... 33/613 |
| 2011/0083336 A1 * | 4/2011 | Pianetto ....................... 33/613 |

OTHER PUBLICATIONS

Schulte 5010672040 Combination Template by Schulte, as described at http://www.amazon.com/Schulte-5010672040-Combination-Template/dp/B000KPUFX2, Jan. 4, 2012.

(Continued)

*Primary Examiner* — G. Bradley Bennett

(57) ABSTRACT

A template tool is provided for locating sites for fixing to walls hardware for mounting a wire shelf. The tool has two legs perpendicular to each other along a bend locatable along a corner of two walls in which the legs each extend along one of two walls from the corner to enable hole(s) or opening(s) along each of the legs to align over locations of sites for fixing shelf support hardware to the walls to horizontally install a shelf. One leg has a horizontal bubble level and is adjustable or non-adjustable in length in accordance with shelf depth. An aperture along one leg is preset a distance from one end thereof for use in successively locating sites along the back wall. Sites are thus locatable along each of two corners formed by two opposite side walls and a common back wall, and along the back wall between such corners.

20 Claims, 8 Drawing Sheets

(56) References Cited

OTHER PUBLICATIONS

Closetmaid, Building Division Price List, Emerson Storage Solutions, pp. 2-6, 2005.
Closetmaid, Project Planner & Installation Guide, pp. 1-3, Dec. 2010.
Closetmaid, How-To Guide, Installing Wall Brackets, as described at http://www.closetmaid.com/install/how_to_guide/wallbrackets.cfm, Dec. 28, 2010.
Organize-It, Installing Wire Shelving, as described at http://www.organizeit.com/stat_wireshelf_install.asp, Dec. 28, 2010.
Organize-It, Installation Template for Wire Shelving, as described at http://www.organizeit.com/powireinsttemp.asp, Dec. 28, 2010.
Craftsman 12" Square w/Buffle Level and Scribe Tool, as described at http://cgi.ebay.com/Craftsman-12-Square-w-Bubble-Level-and-Scribe-Tool-/2806031027, Dec. 16, 2010.
Johnson Level & Tool Mfg. Co., Level, as described at http://www.johnsonlevel.com/levels.asp, pp. 1-10, Dec. 16, 2010.

* cited by examiner

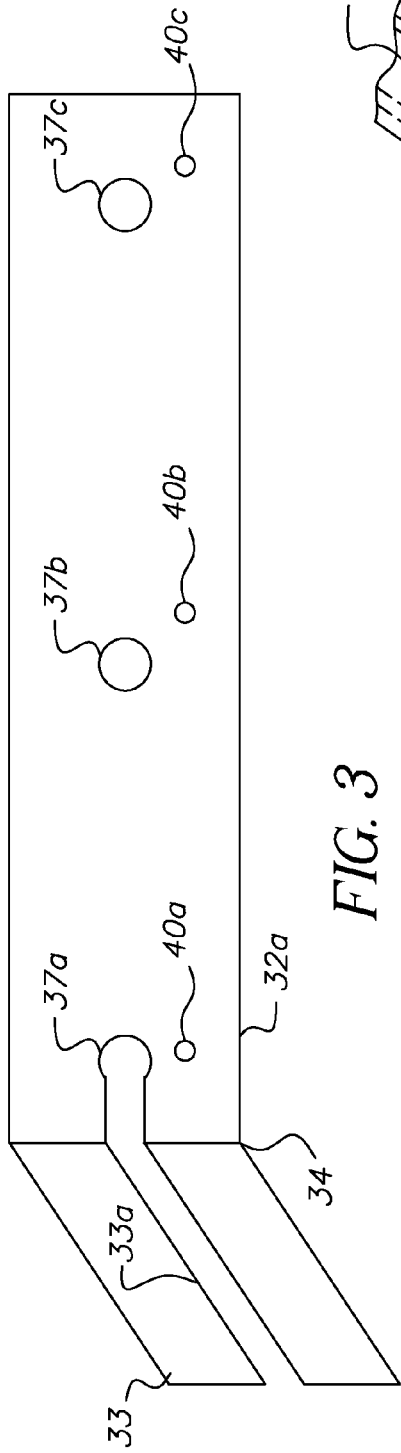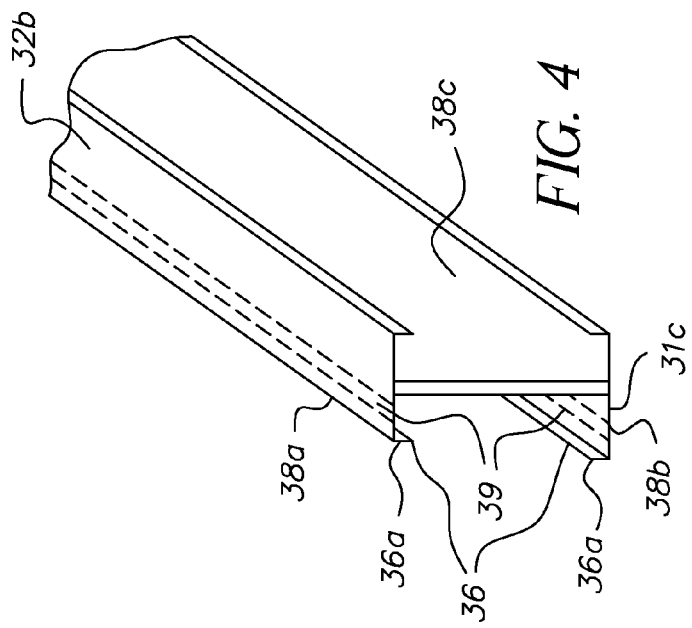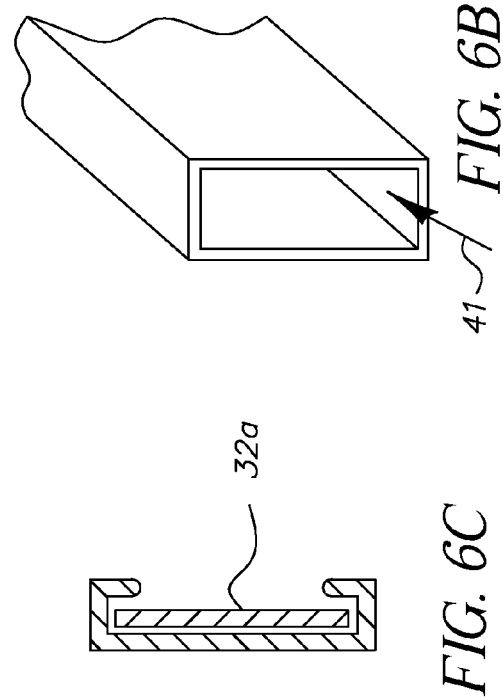

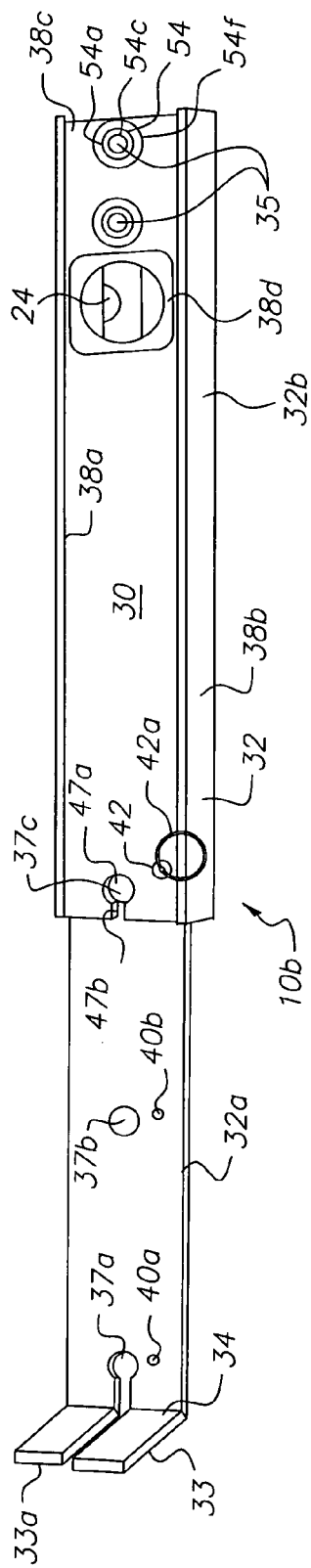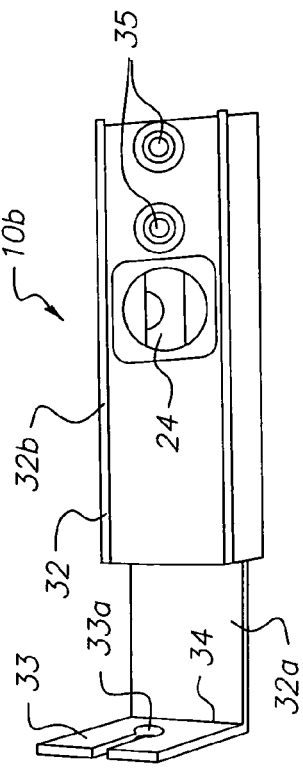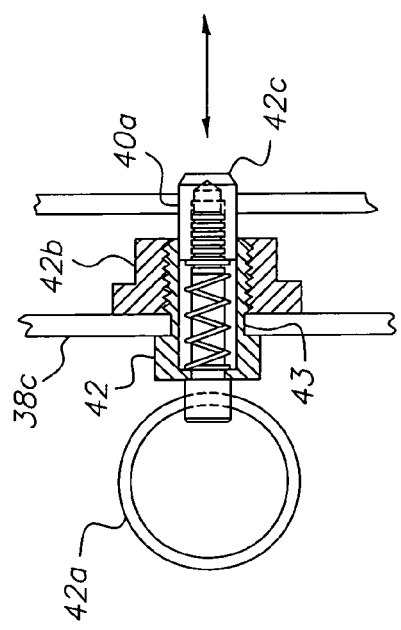

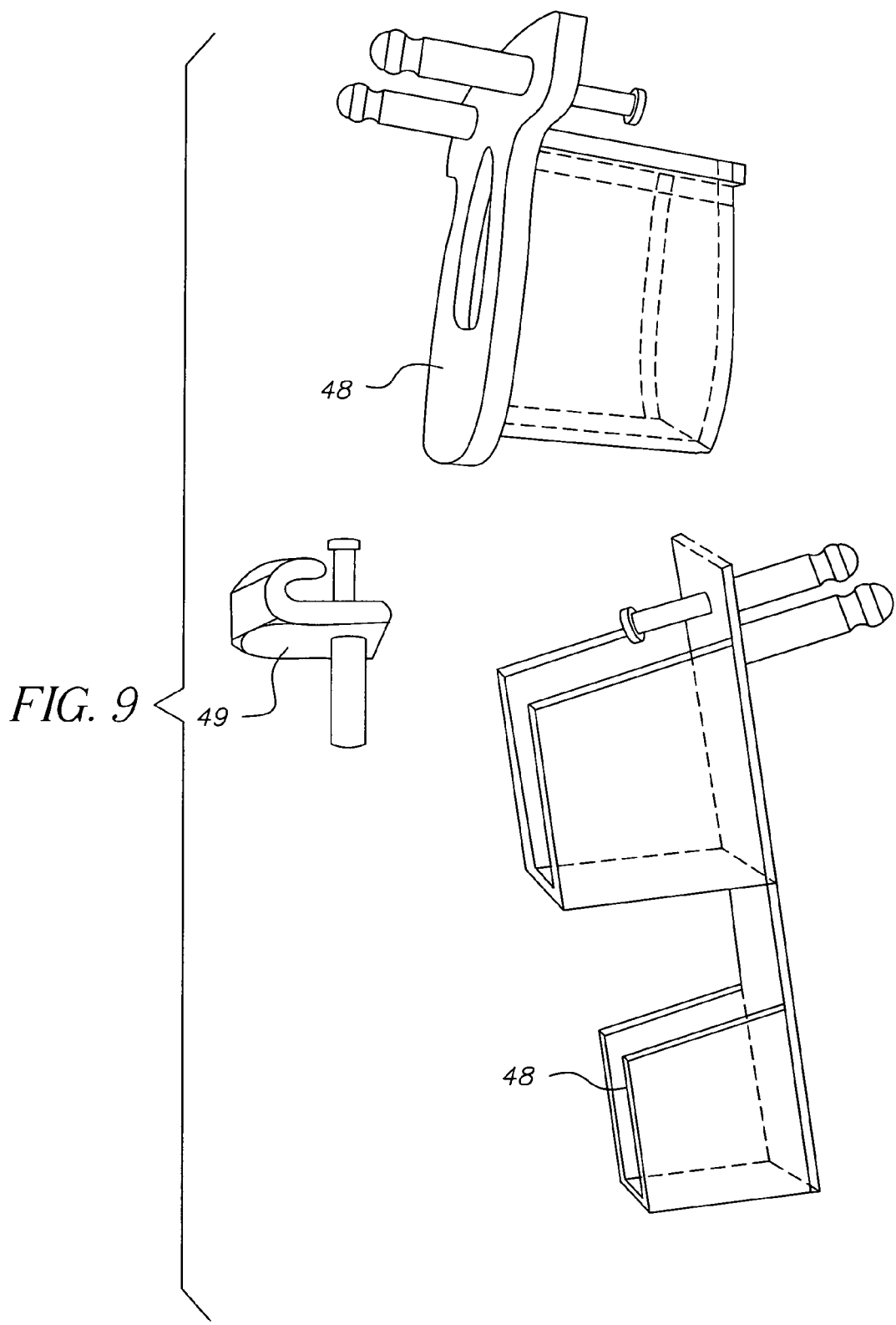

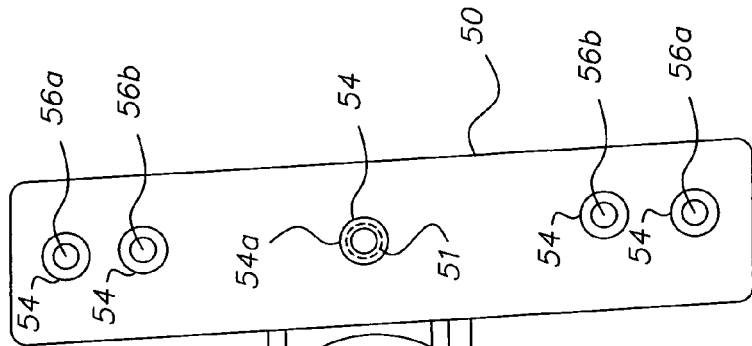
FIG. 10
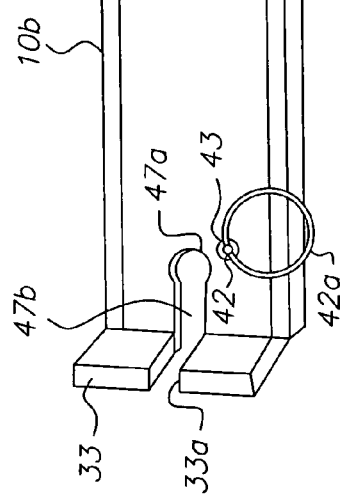
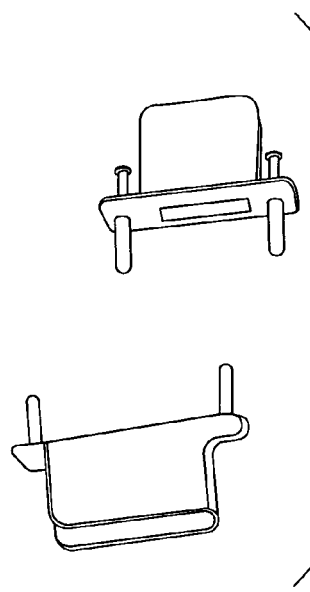
FIG. 11

TEMPLATE TOOL FOR LOCATING SITES FOR FIXING SHELF MOUNTING HARDWARE TO WALLS

This Application claims the benefit of priority to U.S. Provisional Patent Application No. 61/460,798, filed Jan. 7, 2011, which is herein incorporated by reference.

FIELD OF THE INVENTION

The present invention relates to a template tool for locating sites for fixing mounting hardware which supports a shelf, and particularly to, a template tool having holes or openings for locating sites for fixing along walls shelf support mounting hardware (e.g., brackets, clips, or the like) which receive and support different parts of a wire shelf. Shelf support mounting hardware also includes fastener elements (e.g., anchors, screws, pins, or nails) which fix brackets or clips to walls (e.g., via drilled holes) at located sites. The template tool of the present invention is useful in that it provides a single compact tool that can be easily carried in a typical drill or tool box, has holes or openings that align to provide the proper locations of sites for fastener elements of desired brackets and clips for installation of a wire shelf along walls in a room or closet so that such shelf can be installed in less time and is assured to be horizontally level.

BACKGROUND ON THE INVENTION

Installing wire shelves, such as made by ClosetMaid®, Rubbermaid®, Shutly®, or the like, utilize shelf mounting hardware, such as bracket, clips or the like, and wall fastener elements for use with same, upon two opposing side walls and a back wall along which the shelving is to be installed in a closet or room. Typically, brackets are located along the side walls to capture and retain the front end of the shelf, while wall clips capture the back of the shelf. FIG. 13A shows an example of side wall bracket 1 on side wall 7a and back wall clip (or bracket) 2 on back wall 7b of a corner of a closet or room, and a partially shown wire shelf 3 supported by such bracket 1 and wall clip 2. FIG. 13B shows an exploded view of a typical installation of an end bracket 1 having screws 4 through openings 5 of bracket 1 into holes 6 drilled into a right side wall 7a. The front portion or lip 3a of the shelf 3 is received in pocket or slot 8 of side wall bracket 1 when pivoted downward as indicated by arrow 9 after the wall clip 2 fastened to back wall 7b receives back bar or wire 3b. Multiple clips are spaced along back wall 7b for receiving back bar 3b, and a similar one of side wall bracket 1 would be fastened to a left side wall, in which the shelf is to be supported on brackets and clips along back and side walls of a closet, room, or other location upon a wire shelf is desired. It is important that the side wall brackets are properly positioned along the side walls such that the right and left front ends of the wire shelf will fit easily in such brackets when installed (such as shown in the case of right front wire shelf end of FIG. 13A), and so that the shelf when installed will not be undesirably tilted. This is predicated on the wall fastener elements, such anchors, pins, screws, or nails, for such brackets are at the correct sites along the side walls in accordance with depth of the shelf and at a proper level.

Heretofore no single template exists that can easily locate sites for drilling holes for hardware elements in both back wall and side walls, and especially a tool which is adjustable to one of different depths for use installing different depth wire shelves. Typically, wire shelves are manufactured having a variety of different depths, commonly these are 6, 9, 12, 16, and 20 inches.

Although templates have been developed for locating drilling sites for bracket/clip hardware, they are usually made of paper for application onto a wall, or are complex and expensive, such the ClosetMaid® Installation Template Model Nos. 903700, 903800, or 96800. Further, these templates are not for use at the same time along two different walls, such as in the each corner where a wire shelf ends. Each of the corners being formed by one of the two side walls and back wall into the shelf will be installed.

SUMMARY OF THE INVENTION

Accordingly, it is an object of the present invention to provide an improved template tool for locating sites for fixing mounting hardware in form of brackets, clips, or the like, to walls which supports shelving, and in particular a wire shelf.

Another object of the present invention is to provide an improved template tool for locating sites for fixing to walls a plurality of brackets or clips for receiving and supporting different parts of a wire shelf along such walls.

It is a further object of the present invention to provide an improved template tool for locating sites for fixing mounting hardware to walls in which the tool either can be adjusted for installing a variety of different depth shelves, or such tool is one of a plurality of template tools each for installing a different depth shelf.

A still further object of the present invention is to provide an improved template tool for locating sites for fixing mounting hardware to walls that can be adjusted for installing a variety of different depth shelves and also has a releasable locking mechanism for locking the tool to one of a plurality of different depths.

It is another object of the present invention to provide an improved template tool for locating sites for fixing mounting shelf support hardware along both back and side walls which is compact in size.

A further object of the present invention is to provide a template tool for locating sites for fixing mounting shelf support brackets or clips for use in right or left corners at the intersection of right and left side walls, respectively, and a common back wall.

A still further object of the present invention is to provide a template tool for locating sites for fixing mounting shelf support hardware to walls that can have a built-in level for use in horizontally leveling the tool when such sites are located, and thus that shelf support hardware when fixed to the wall supports a shelf which is horizontally level.

Briefly described, the present invention embodies a template tool (or apparatus) having a first leg and a second leg, in which each of the first and second legs have one or more holes or openings, and the first leg and the second leg are perpendicular to each other along a bend locatable along a corner of two walls in which the first and second legs extend along different ones of the two walls from the corner to enable the one or more holes or openings along each of the first and second legs to align over locations of sites for fixing shelf support hardware to the walls.

An aperture (or opening, hole, or slot) may also be provided along the first leg which is preset a distance from one end thereof for use in successively locating sites along the back wall. The tool enables a user to manually locate sites for fixing shelf mounting hardware (e.g., brackets, clips, or the like) by separately orienting the tool into each of two corners formed by two opposite side walls and a common back wall along which a shelf will be installed, and then successive orienting the tool along the back wall between such corners. Optionally, the tool may be used for locating sites for fixing shelf mounting hardware without being used for successively locating sites along the back wall between such corners, and thus the first leg may be provided with or without such aperture. The term "back wall" is defined herein as a wall which will be adjacent the back end of the wire shelf along the length thereof, and the term "side wall" is defined herein at being adjacent one of the opposing side ends of the wire shelf when installed.

The number of the one or more holes or openings along the first leg of the template tool is equal to the number of holes needed for wall fastener elements of the desired side wall bracket(s) to be used, such as two holes. When the bend of template tool is located over one of the two corners into which a shelf will be installed so that first and second legs extend horizontally (or approximately horizontal) along a side wall and a back wall, respectively, the holes or openings aligned over the sites along the side wall may be drilled through so that fastener elements of the desired shelf support hardware (bracket or clip) can later be fixed therein, or such sites may be marked with a marker on the side wall through such holes or openings and then later drilled. Also, a hole may be drilled at the site along the back wall through a hole or opening of the second leg of the tool (or the site may be marked with a marker). The marker may be a pencil, pen, or other writing implement.

In one embodiment, each of the one or more holes or openings of the first and second legs are aligned along a common plane and thus horizontally level when the tool is aligned over locations of sites over a corner's perpendicular wall surfaces upon which the legs of the tool are positioned. Such is useful when the sites need to be all horizontally level so that the mounting shelf support hardware will be horizontally level, and when side wall mounting hardware are used having fastener elements that need to be horizontal with the shelf to be installed. In another embodiment, the one or more holes or openings of the first leg are at least two in number and are vertically aligned when the tool is horizontally level and aligned over sites over a corner's perpendicular wall surfaces. Such vertical alignment is along the depth of a shelf by providing the first leg with vertical holes or openings, rather than horizontal holes, for alignment with sites along a side wall. Such vertical holes or openings may be provided by the first leg having a third leg perpendicular to the first leg and having such vertical holes or openings for locating sites along a side wall. The third leg may represent an optional attachment to one end of the first leg or part of the first leg.

Also, preferably the template tool has a bubble type level to facilitate a user leveling the template tool in a corner horizontally along the back wall and the side wall extending from such corner. Assuring the level of the template tool prior to installation of any shelf mounting hardware avoids determining improper installation only after the shelf mounting hardware and shelf are already installed. Less preferably, a separate leveling device, such as a bubble type torpedo level, may be used to assure that the template tool is horizontally level along walls when used.

In one embodiment, the first leg is of a fixed length, but in the preferred embodiment the first leg is of adjustable length. To enable such adjustability, the first leg has two generally longitudinal first and second sections. The first section is coupled to the second leg at the perpendicular bend described earlier, and the first and second sections are slidably disposed with respect to each other to adjust the length of the first leg. This enables the one or more holes or openings along the first leg present in the leg's second section to vary in their positions along the first leg such that their positions are adjustable in accordance with the depth of the shelf to be installed. The second section may represent a structure having a track into which the first section is received, or a square tube along which the first section is slidable. A mechanism for releasably locking the first section with respect to the second section may also be provided to lock the length of the template tool's first leg so as to enable the one or more holes or opening of the first leg to be at proper distance from the template tool's bend in accordance with the depth of a shelf when the tool is used.

The shelf support hardware, i.e., brackets, clips, or the like, may be typical of those used with wire shelving, such as manufactured by Closetmaid® or Rubbermaid®, and have opening(s) or hole(s) for fastener elements, e.g., anchors, pins, screws, nails, or the like, which become part of the shelf support hardware when used to fix bracket and clips to walls at desired locations for mounting a shelf. However, shelf support hardware for other types of shelving may similarly be installed using the template tool. Fastener elements may be pre-installed in brackets, or separate there from, prior to their use in fixing shelf support hardware to walls. The shelf support hardware may be side wall brackets each having two openings or holes for receiving two fastener elements, in which the two holes or openings of the template tool's first leg are positioned along that leg to spatially correlate with openings or holes of the side wall bracket. The mounting shelf support hardware may also include back wall brackets or clips having a single opening or hole for a fastener element. The hole or opening of the second leg may be a slot extending in a direction along the length of the shelf to be installed, and such slot may extend partially along the first leg.

The tool may be considered as being operable in two modes. The first mode of operation of the tool is for locating sites for fastener elements for mounting shelf support hardware in left and/or right corners of a closet or room into which a wire shelf is to be installed. The second mode of operation of the tool locates additional sites for fastener elements for mounting shelf support hardware along the back wall after the tool is operated in a first mode in at least one of the left and right corners. Preferably, to enable a user to operate the tool in the second mode, the first leg's earlier described aperture is provided at a preset length, e.g., 12 inches, from one end of the first leg, or other desirable distance to be provided between two successive back wall brackets. Although one such aperture is preferred, more than one may be provided each set to a different length from one end of the first leg. When such one end of the first leg is aligned with a site previous aligned with the template tool along the back wall, and the rest of the leg lies horizontal along the back wall (such may be checked by use of the bubble level in the tool, if present), the aperture of the first leg aligns over a location of a site along the back wall for fixing shelf support hardware for the shelf be installed. The first such site along the back wall is associated with the use of the template tool in the first mode, while subsequent sites along the back wall may be found by repeating use of the template tool in its second mode. Thus, the entire installation of a wire shelf in a room or closet may thus be accomplished with a single template tool of the present invention operating in a first mode for locating sites for shelf support hardware along each of left and right side walls, and in a second mode for locating sites for shelf support hardware along the back wall between the left and right side walls.

The present invention also comprises a method for locating sites for wall fastener elements for installing shelving along two side walls and a back wall extending between the side walls comprising the steps of: operating a tool in a first mode for locating sites along a first side wall for fastener elements for a side wall bracket in which the tool has a first leg with holes for the sites along the side wall, and a second leg perpendicular with the first leg having an opening aligned with a site along the back wall nearest the side wall; operating the tool in a second mode for locating one or more sites along a back wall for fastener elements, in which for each of the one or more sites along the back wall the site aligns with an opening in the first leg near one end of the first leg which is a predetermined distance from other end of the first end aligned with the nearest previous site aligned (marked or drilled) along the back wall, and a first of the previous site is the site aligned with the opening along the back wall when the template was operated in the first mode; and repeating the step for operating the tool in a the first mode for a second side wall.

BRIEF DESCRIPTION OF THE DRAWINGS

The foregoing and other objects, features and advantages of the invention will become more apparent from a reading of the following description in connection with the accompanying drawings in which:

FIG. 3 is a perspective view of part of the tool of FIG. 2 shown removed from the track of the tool;

FIG. 4 is a partial side perspective view of part of the tool of FIG. 2 having the track of the tool;

FIG. 5 is a perspective view of the tool of FIG. 2 in which the tool is shown adjusted for installing a shelf at the longest depth for the tool;

FIG. 6A is an example of a releasable locking mechanism in the tool of FIGS. 2 and 5;

FIG. 6B shows a partial side perspective view of a part of the tool of FIG. 2 in which its track portion is provided by a hollow tube in which the interior of the tube provides a track;

FIG. 6C is a cross-section through a part of tool of FIG. 2 in which its track portion is provided by different slotted structure from FIGS. 2 and 5;

FIG. 7 is a perspective view of the tool similar to FIG. 5 in which the tool is adjustable for use in installing different depth shelves of smaller depths than the tool of FIG. 2 in a corner of a room or closet;

FIG. 9 shows typical side wall brackets using horizontal fastening elements, and a back wall clip (or bracket) for a wire shelf;

FIG. 10 is a perspective view of the tool of FIGS. 2 and 5 having an attachment for providing vertically aligned holes for use in locating sites along a side wall for fastener elements for a side wall bracket using vertically aligned fastener elements;

FIG. 11 shows an example of typical end brackets using vertical fastener elements for a wire shelf;

DETAILED DESCRIPTION OF THE INVENTION

Figure 1:
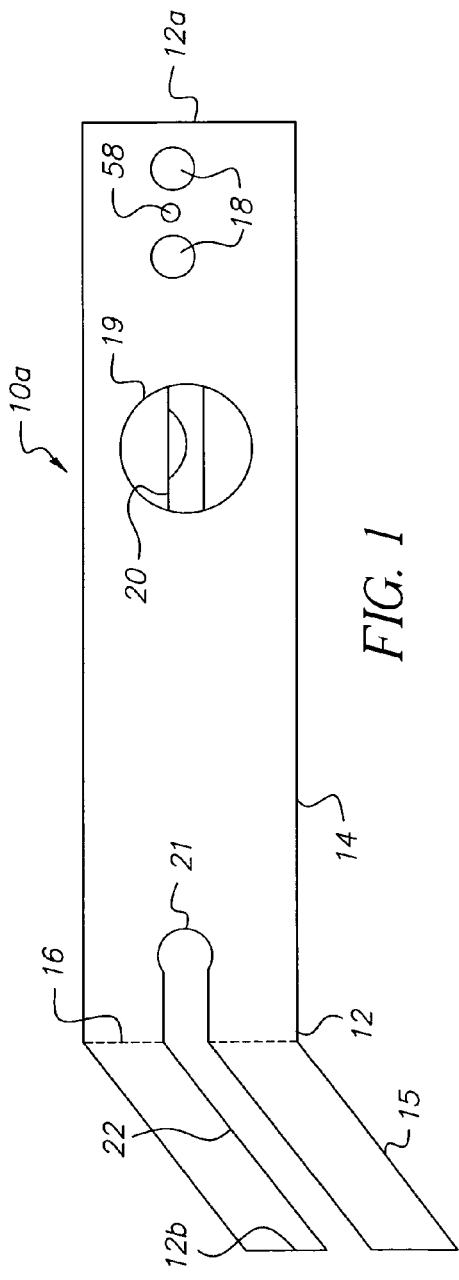
FIG. 1 is perspective view of a template tool in accordance with a first embodiment of the present invention for installing a shelf in a corner of a room or closet having a desired depth.

Referring to FIG. 1, a template tool 10a is shown having two legs 14 and 15 which are perpendicular (90 degrees) to each other. The two legs 14 and 15 may be provided by a member 12, such as a sheet of metal, e.g., aluminum, bent 90 degrees at a bend 16 to provide legs 14 and 15. Near or at end 12a of tool 10a are two holes (or openings) 18. The other end 12b of tool 10a is an opening or slot 22 which extends through leg 15 and then partially along leg 14, such as about 1 inch from bend 16. Holes 18 may be ¼ inches in diameter, and slot 22 ¼ inches in width, but other diameters and widths may be used, such as ⅜ inches. End 21 of slot may have a diameter of about ¼ to ⅜ inches. For example, each of legs 14 and 15 is ⅛ inches thick and about 2 inches wide (e.g., 1⅞ inches), leg 15 is 2½ inches in length from bend 16, and leg 14 is slightly longer, such as 1 inch, than the depth of a shelf to be installed using the tool as a template for sites along the two walls of a corner into which the end of the shelf is to be installed. Leg 15 may extend a different distance from bend 16, but should be more than the distance from the corner to the site of a fastener element of a first wall clip from the corner. The distance from slot end 21 to edge of the tool 10a at end 21a may be approximately 12 inches. A bubble level 20 is mounted in an opening 19 of leg 14. Tool 10a may be made of metal or of molded plastic, such as PVC. The holes 18 are aligned with slot 22 along a common plane.

The holes 18 are positioned in accordance with the depth of a shelf so that the center point (indicated by 58) between such holes to bend 16 is at least approximately at the depth of the shelf to be installed. Holes 18 are separated from each other in accordance with the fastener elements of the side wall bracket to be used. For example, when the depth of the shelf to be installed is 12 inches, the length along leg 14 from bend 16 to the center point 58 is 12 inches. Optionally, slot end 21 may be provided as a hole or aperture, and the slot 22 extend partially along leg 15 towards bend 16. Also, slot 22 may have a closed end, or provided by one or multiple openings or holes along leg 15 spaced from each other and horizontally aligned with holes 18.

Tool 10a is locatable in a corner of a room or closet where one end of a shelf is to be installed, such that the back side of the tool at bend 16 lies in (or near) such corner, and first and second legs 14 and 15 are disposed against or facing the side and back walls, respectively, which extend from the corner. The tool is manually held by the person installing the shelf and leveled using level 20 with the center of slot 22 at the desired shelf height. The center between the two holes 18 of leg 14 to bend 16 along the side wall is equal to the depth of a shelf to be installed, and a center line through slot 22 along leg 15 extends in a direction along the length of the shelf to be installed along the back wall. This enable holes 18 of leg 14 and the slot 22 of leg 15 to align over locations along the side and back walls, respectively, of sites for shelf mounting hardware which supports shelving. In particular, these are sites for fastening elements of the shelf mounting hardware. The level 20 has typical guide lines such that when the bubble is centered about such guide lines that tool 10a and its legs 14 and 15 are horizontally level, and thus the common plane of slot 22 and holes 18 is horizontally level. Such common plane will be the same or substantially the same as the horizontal plane at which the shelf will be when installed at the desired vertical height from a floor. A marker (e.g., pencil, pen, or other writing instrument) may be used to make marks through holes 18 on the side wall, or holes in the side wall may be drilled through such holes 18. To avoid possible damage to tool 10a by a drill bit, a bushing may be present in each of holes 18 and retained therein by a nut, in which the holes 18 are sized to receive the bushing. The bushing has a hardened metal center hole, such as of ¼ inch diameter through which a drill bit is extended when drilling a hole in a side wall. If needed, a hole may be drilled (or a marker to make a mark) at a site through slot 22 of leg 15 along the back wall spaced about 2 inches from the corner of the room or closet. Such site along the back wall is for a fastener element to be later inserted.

A plurality of template tools 10a may be provided each having a different length leg 14 to provide a different tool 10a for installing different depth shelving, such as of 6, 9, 12, 16, and 20 inches, in corners of a room or closet. In FIG. 1 the relative scale of legs 14 and 15 illustrates a 12 inch depth shelf template tool from the center between holes 18 to bend 16. Leg 14 can be reduced in length for a 6 inch or 9 inch depth shelf template tool, respectively, or extended for a 16 or 20 inch depth shelf template tool, in which the depth of the shelf is set by the distance from bend 16 to the center between holes 18. Less preferably, level 20 and opening 19 are not provided, and a separate leveling device is used when sites are located with template tool 10a. Preferably, the template tool of the present invention is provided which is adjustable for installing different depth shelves, such as shown in FIGS. 2-5.

Referring to FIGS. 2, 3, 4, and 5, a template tool 10b has a member (or structure) 30 having two legs 32 and 33 which are perpendicular to each other. Leg 32 has two leg sections 32a and 32b which are slidably disposed with respect to each other. Leg section 32b has two holes (or openings) 35 near the end 31b of member 30, and such holes 35 are the same as holes 18 described above for tool 10a. Leg section 32a and leg 33 are of the same shape as leg 14 and leg 15 of tool 10a, respectively, except that leg section 32a is shorter than leg 15 and does not include holes 18. Leg section 32a and leg 33 are perpendicular to each other along a 90 degree bend 34, as best shown in FIG. 3 in which section 32a and leg 33 are shown removed from section 32b. Leg 33 has a slot 33a which extends through leg 33 and then partially along leg section 32a, such as about 1 inch from bend 34. End 37a of slot 33a may have a diameter of about ¼ to ⅜ inches. Slot 33a is aligned along a common plane with holes 35 in tool 10b. Leg 33, slot 33a, and end 37a may be the same as leg 15, slot 22, and end 12b, respectively, described earlier. Holes 37b and 37c are provided along leg section 32a, in which slot end 37a is spaced from hole 37b, such as by 4 inches, and hole 37b is spaced from hole 37c, such as by 4 inches. Optionally, slot end 37a may be a hole, and the slot 33a extends partially along leg 33 towards bend 34. Also, slot 33a may have a closed end, or provided by one or more openings or holes along leg 33 spaced from each other and horizontally aligned with holes 35. A bubble level 24 is mounted in an opening 38d in wall 38c, such level 24 may be the same as level 20 described earlier. Leg section 32b may be considered a track member, and section 32a with leg 33 a slide member which slides along a track of the track member, such that the assembly of track member and the slide member provides a first leg of tool 10b. Other mechanisms for receiving second section 32a into a first section 32b and slidable there along to adjust the length of the first leg provided by such first and second sections may also be used, so that the length of the first leg from the bend 34 to holes 35 is in accordance with the depth of a shelf to be supported by the shelf support hardware. Thus, different depth shelves are installable using the same template tool 10b by adjustment of the tool in accordance with shelf depth.

Figure 2:
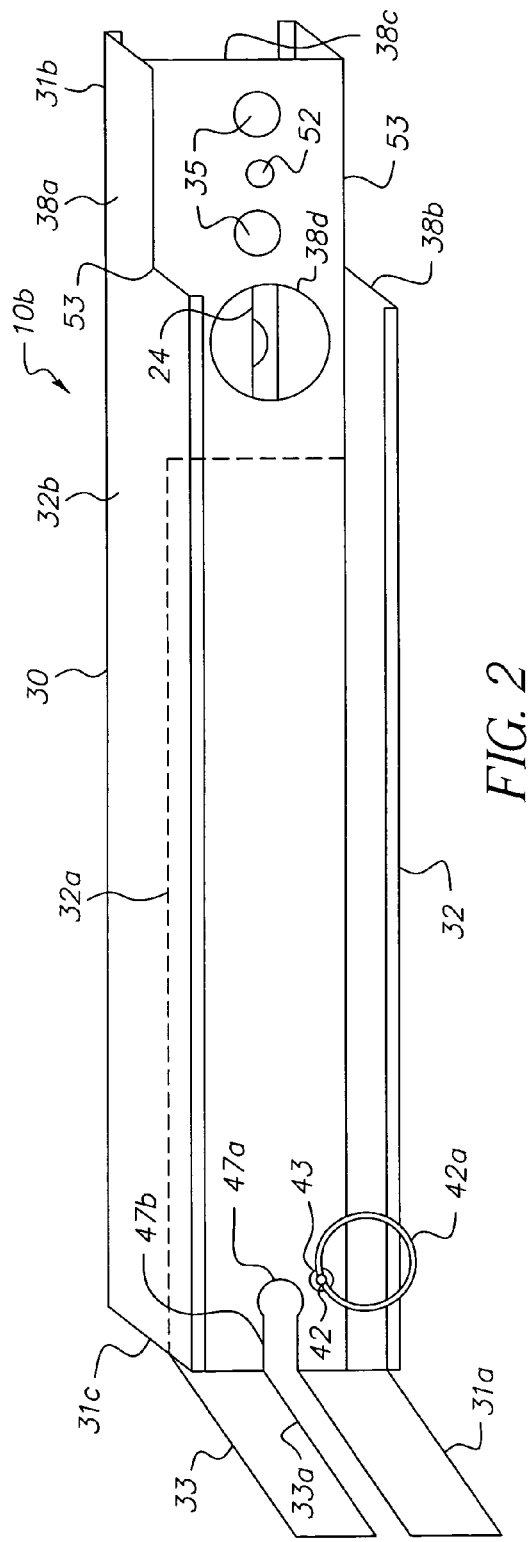
FIG. 2 is perspective view of a template tool in accordance with a second embodiment of the present invention which is adjustable for use in installing different depth shelves in a corner of a room or closet in which the tool is shown adjusted for installing a shelf at the smallest depth for the tool.

Section 32b has an "I" shaped cross-section formed by two parallel walls 38a and 38b facing each other, and a third wall 38c perpendicular and connecting walls 38a and 38b. Section 32a is slidable in section 32b along a track 39 along the front or back side of the tool between walls 38a and 38b, substantially parallel to wall 38c, as best shown in FIG. 4 with leg section 32a removed. As shown in FIG. 4, track 39 may be formed by two opposite longitudinal notches or grooves along the length of walls 38a and 38b sufficient for the section 32a to fully slide into section 32b from end 36a, but preferably track 39 is provided by a pair of opposing flanges 36 extending from the edge of walls 38a and 38b, where each flange has a lip 36a. Section 32a is then received between flanges 36, where the width of section 32a is slightly less than the length between the inside of flanges 36. Preferably, leg section 32a slides back and forth in leg section 32b along the back side of the tool 10b between walls 38a and 38b, substantially parallel to wall 38c, in which dashed lines show the extent of member 32a in FIG. 2 when leg section 32a is fully slid in leg section 32b. A slot 47b in wall 38c is provided in leg section 32b from end 31c to end 47a, such that when leg section 32a is fully received in leg section 32b the slot 47b and its end 47a aligns with the extension of slot 33a and its end 37a along leg section 32a, such as shown in FIG. 2. Optionally, slot 47b is not provided, and slot end 47a is replaced with a hole of about ¼ to ⅜ inch diameter in wall 38c.

Leg 33 and leg section 32a may be a sheet of metal (such as aluminum) bent 90 degrees at a bend 34, molded plastic, or two metal pieces welded together. Leg section 32b may be made of aluminum, or other rigid material, such as plastic. For example, leg section 32b may be 13 inches long. The leg section 32a may be of ⅛ inch aluminum, 10 inches in length and about 1⅞ inches in width, so that leg section 32a rides, slides or travels in the track of section 32b but otherwise fits snuggly therein.

Leg sections 32a and 32b are slidably disposed with respect to each other along track 39 to adjust the length of leg 32 and enable holes 35 along leg section 32b to vary in their position along leg 32. FIG. 2 shows leg section 32a adjusted with respect to leg section 32b for use in installing the shortest depth shelf (e.g., 12 inches), while FIG. 4 shows leg section 32a adjusted with respect to leg section 32b for installing the longest depth shelf (e.g., 20 inches).

Figure 12:
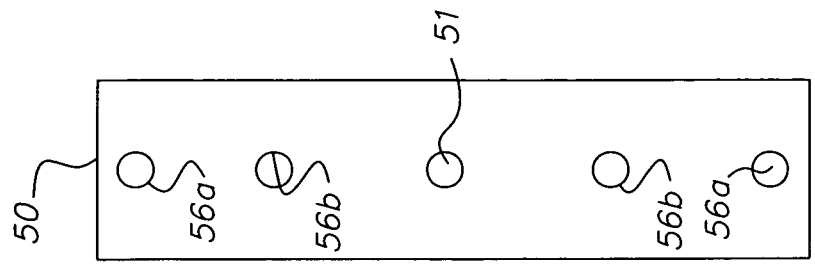
FIG. 12 is a plan view of the attachment of FIG. 10.
Figure 12A:
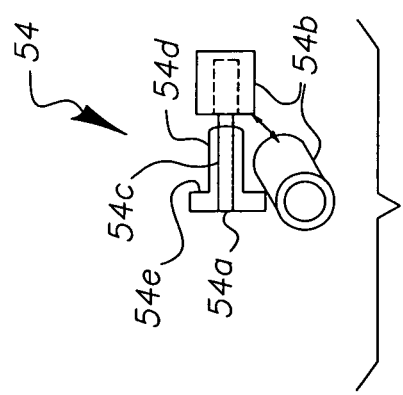
FIG. 12A is an illustration of an example of a grommet bushing having a central hole which may be used in holes of the tool of FIGS. 1, 2 and 10.

The diameter of holes 35 are in accordance with the desired wall fastening hardware associated with a side wall bracket, such as ¼ inch diameter. Holes 35 are preferably ⅜ inches in diameter. Each of holes 35 has a ⅜ inch hardened steel grommet or bushing 54 (FIG. 5). An exploded view of a bushing 54 is shown in FIG. 12A. Bushing 54 has a ¼ inch diameter interior hole 54c extending through the bushing's head 54a and a threaded end 54d which can extend through hole 35, and a threaded plastic (e.g., nylon) cylindrical nut 54b on the other side of hole 35 tightened about the bushing's threaded end 54d to retain the bushing in hole 35. The nut 54b may extend less than the width of one of the flanges 36 to its lip 36a, but preferably is approximately the same length as the outside of flange lip 36a such that when the tool 10b is disposed in a corner (in the same manner as described earlier in connection with tool 10a) the outside of lip 36a of the pair of flanges 36 facing the wall lies against the side wall, and each nut 54b retaining bushings in holes 36 lies against the side wall.

One advantage of the bushing 54 is that the hardened cylindrical metal interior surface of bushing's central hole 54b provides a path perpendicular with wall 38c of leg 32 for a drill bit to extend there through to a side wall of a room or closet such that that the drill bit avoids contacting wall 38c thereby damaging the tool about hole 35. The end 54d may extend through a washer 54f (FIG. 5) prior to placing through hole 35 and retained thereto by nut 54b. The washer thus avoid contact of ledge 54e of head 54a with the surface of wall 38c about hole 35. The washer may be of plastic (e.g., nylon) and having a ⅜ inch interior diameter.

Leg 32 is thus adjustable to different lengths depending on the extent section 32a extends from section 32b such that length from the center between two openings 35 to bend 34 is equal to the depth of a shelf. Preferably, holes 40a, 40b, 40c are provided along leg section 32a which are preset for a different one of three different depth shelves, such as for 12, 16 and 20 inch depth shelves, respectively. A releasable locking mechanism is provided by a spring biased pin 42 in an opening 43 of leg section 32b near its end 31c. The pin 42 is spring biased into one of holes 40a, 40b, or 40c so as to temporarily fix leg sections 32a and 32b to each other when the pin 42 is received in one of holes 40a, 40b, and 40c. A metal ring 42a attached to the spring biased pin 42 may be used to assist a user in manually pulling back the pin from its position in any of holes 40a-c and thereby releasing the locking mechanism, such that leg section 32a may slide freely in leg section 32b to lock into a different one of the holes 40a-c for pin 42. Thus, each of holes 40a, 40b, and 40c when receiving pin 42 presets the extent section 32a extends from section 32b such that the length from the center between two openings 35 to bend 34 is equal to depth of a 12, 16, and 20 inches shelf, respectively. For example, spring biased pin 42 may be a stubby pull ring retractable plunger non-locking with locking element from Springplunger.com Model No. 54451, such as shown in the partial cross-section in FIG. 6A having a threaded nut 42b onto end 42c threaded to received such nut 42b to retain pin 42 to leg section 32. For purposes of illustration, the forward end 42c of pin 42 is shown extended through hole 40a. When locking pin 42 extends through hole 40b of leg section 32a, hole 37b aligns with slot end 47a. When locking pin 42 extends through hole 40c of leg section 32a, hole 37c aligns with slot end 47a. As will be shown later, the distance between slot end 47a and end 31b of tool 10b may be used for finding sites for back wall clip (or bracket) fastener elements along a back wall. Although pin 42 is shown, other locking mechanisms may also be used, such as a clamp.

Leg 33 and leg section 32a may be assembled, for example, using a piece of aluminum cut to size ⅛ by 2 inches (i.e., to fit into the track of leg section 32b) by approximately 11½ inches long, with a bend 2½ inches from one end to 90° and a slot 33a cut in the 2½ inch bend in center ⅜ inch until end 37a. Optionally, slot 33a is cut 2 inches deep and a hole is provided instead of slot end 37a. Drill three holes 40a-c spaced from each other to accommodate pin lock 42 for locking at each of 12, 16, and 20 inch depth shelf installation, respectively. Drill two holes 37b and 37c near each holes 40b and 40c each to align with slot end or hole 47a when tool 10b is locked for 16 and 20 inch depth shelf installation, respectively. End bracket holes 35 should be in line and level with slot 33a when leg section 32a is received in leg section 32b.

One way to assemble leg section 32b of tool 10b may be by modifying a typical aluminum I-shape level with a built-in bubble level, in which the I-shape level is cut to 13 inches, two holes 35 are drilled at or near the end of section 32b of member 12, and a slot 47b is formed to end 47a. Hole 43 may be drilled in the I-shape level to install locking pin 42 near slot end 47a. A hole may be drilled for 12 inch spacing for locating sites for shelf mounting hardware along a back wall, if desired.

Alternatively, leg section 32b may be a square or rectangular tube such as shown in FIG. 6B for receiving leg section 32b in the direction of the arrow 41. A bubble level may be situated in such tube along with a hole for locking pin 42. In another alternative, leg section 32b may be a wall having the same features as wall 38 (e.g., level, openings, holes, and slot) and a pair of opposing flanges similar to flanges 36 and lip 36a extending from the top and bottom of wall 38 which define the track for leg section 32a, as shown in the cross-section of FIG. 6C. Other mechanisms for enabling longitudinal sliding of one leg section 32b with holes 35 with respect to leg section 32a may also be used.

Template tool 10b locates sites for drilling holes into walls for installing brackets retaining wire shelving. It is used for drilling end bracket holes, and is adjustable for increments of 12, 16 and 20 inches, with a built-in level and slider mechanism (i.e., track of section 32b and section 32a received in track of adjustable length leg 32) to drill 12, 16 and 20 inch shelving side bracket holes. The tool 10b may be used for installing shelving in very tight spaces, is locatable in corners against right or left side walls, and is so compact in size that it can fit in most drill boxes, handheld tool boxes, or the like. The tool can also be used to level shelving, as well. Unlike the prior art, no large template is needed for single shelf installation. If desired, the same tool 10b, which is manually oriented in a first mode to align with sites along each of left and right corners into which a shelf installation is desired so that wall and side wall brackets or clips fixed in such sites enable horizontal shelf installation at a desired height, may also be manually oriented in a second mode for locating additional sites along the back wall for drilling holes to mount back wall shelf installation hardware (i.e., brackets or clips fixed by fastener elements). In such second mode, the tool's slot end 47a is aligned with one of hole 37a, 37b, or 37c for each different depth selection, respectively such that the tool 10b at any depth selection can also be used to locate sites about 12 inches apart horizontally level (using bubble level 24) along the back wall for drilling fastener elements between left and right corners of a room or closet.

A smaller version of template tool 10b is shown in FIG. 7 for accommodating 6", 9" and 10" inch depth shelving having the same components as tool 10b, except leg sections 32a and 32b are decreased in length such that when section 32a is fully slid into section 32b the distance from bend 34 and the center of holes 35 is 6 inches, and holes 40a-c and locking pin 42 are provided for each of the different lengths 6, 9 and 10 inches. FIG. 7 shows an example of tool 10b adjusted for the depth of a 9 inch shelf installation.

Figure 8B:
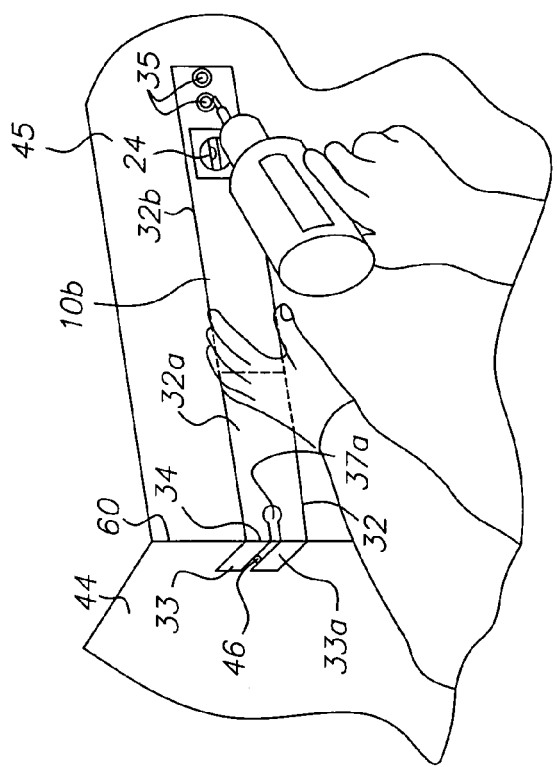
FIGS. 8A and 8B illustrate an example of the use of the tool of FIG. 2 for locating sites along corner of a closet or room for mounting wire shelf support hardware.
Figure 8A:
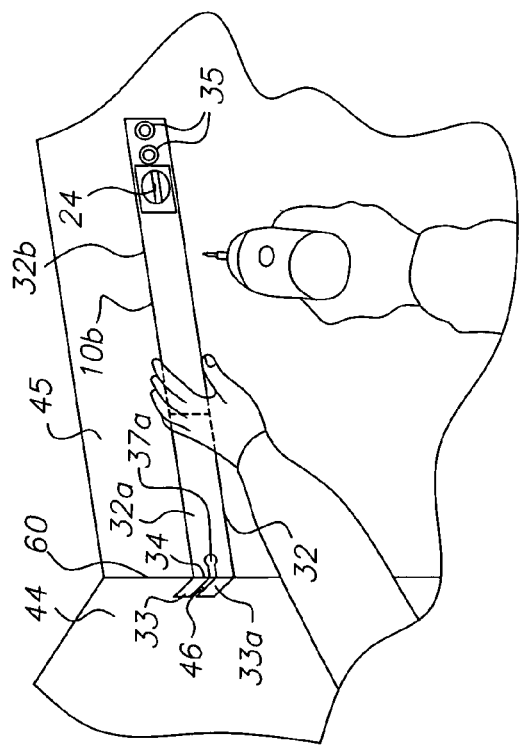

The method of using the tool 10 will now be described for the tool 10b shown in FIGS. 2 and 5 as shown in FIGS. 8A and 8B for a right corner:

(1) Set slide member for either 12, 16 or 20 inch deep shelving by pulling lock pin 42 and sliding the leg 33 with leg section 32a out of leg section 32b to appropriate depth and lock in. In the example of the use of tool 10b shown in FIGS. 8A and 8B the depth is set for 20 inches, such that pin 42 is located in hole 40c. This step can take place with or without the tool being located in the corner where the end of the shelf will be installed.

(2) Determine height of shelf on back wall 44. Drill ¼ inch hole in corner on back wall 44 at such height of shelf, approximately 2 inches from right side wall 45. Line up slot 33a of leg 33 with the hole 46 drilled. Bend 34 is locatable in a corner 60 where one end of a shelf is to be installed such that the leg 32 and second leg 33 are disposed along a right side wall 45 and back wall 44, respectively, which extend from the corner 60, in which the position of the holes 35 of leg 32 along the side wall 45 is in accordance with a depth of a shelf to be installed and leg 33 extends in a direction along the length of the shelf to be installed enabling holes 35 and slot 33a to align over sites along the side wall 45 and the back wall 44, respectively (see FIG. 8A).

(3) Level tool 10b using level 24 to assure that the tool 10b and its legs 32 and 33 are horizontal.

(4) Drill end bracket holes through holes 35 (or holes 54c of their bushings) in the right side wall 45 (FIG. 8B).

(5) Level and drill back wall holes every 12 inches between the right and left side walls from hole 46 (i.e., for the rightmost back wall fastener element). The tool 10b may be used for measuring 12 inch increments by aligning the end of the tool 10b at end 31b with hole 46, leveling with level 24, and then marking or drilling through both slot end 47a and hole 37c as the tool was set for 20 inch depth shelving. Slot end 47a and hole 37c provide an aperture which is at a preset distance from end 31b of first leg section 32b. This is repeated with tool 10b along the length of the back wall until the left corner is reached Another hole may be provided along the back wall near the left corner for the leftmost back wall fastener.

(6) Drill holes for left side wall end bracket using tool 10b to locate hole sites in the same manner as used in steps 2-4. To use the tool in a left corner of a back wall 38 and left side wall opposite the right side wall 45, the tool 10b is flipped 180 degrees from that shown in FIGS. 8A-B such that bend 34 is located in the left corner along the back wall 38. Drill end bracket holes through holes 35 (or holes 54c of their bushings) in the left side wall.

(7) Install back wall clips (or clips) using fastening elements through drilled holes along the back wall 44, and install an end or side wall bracket using fastening elements in each pair of drills holes in the right and left side walls. An example of the installation of a side wall bracket 1 is shown in FIG. 13B, as described earlier, with fastening elements in the form of two screws 4, an example of the rightmost back wall clip 2 is also shown. Example of other fastening elements are pre-loaded pins (or nails) with anchors integrated into brackets, such as ClosetMaid® Superslide® or Totalside® Side Wall Brackets, but any other side wall bracket having two openings for holes drilled or made at two horizontal site associated with holes 35 may be used. Two examples of ClosetMaid® pre-load side wall bracket are shown at 48 in FIG. 9. An example of a ClosetMaid® wall clip pre-loaded with a fastener element in the form of a pin and an anchor is shown at 49 in FIG. 9, but other wall clips may have an opening for a screw.

Figure 13A:
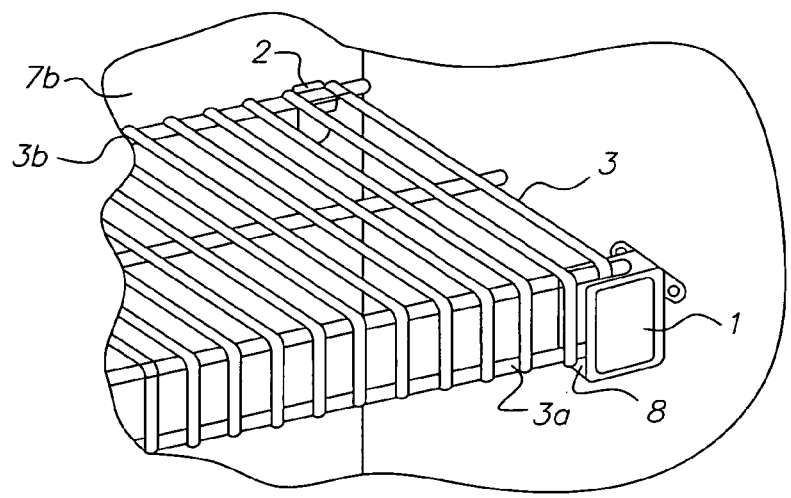
FIGS. 13A and 13B are illustrations of a typical installation of the end of a wire shelf in a corner of a closet or room.
Figure 13B:
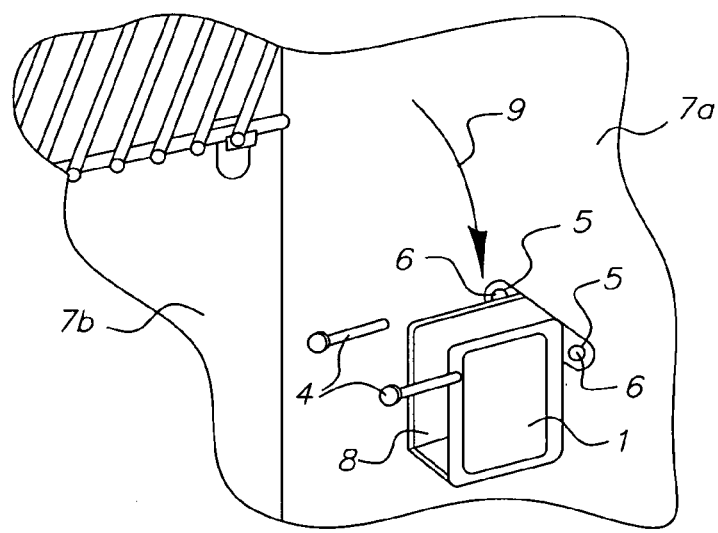

(8) Set wire shelf and supports, such as shown in FIGS. 13A and 13B with respect to a right corner wire shelf installation.

Although the above steps are described for tool 10b, tool 10a may similarly be used in which step 1 above is skipped, and tool 10a has a leg 14 is fixed with respect to distance of holes 18 along leg 14 in accordance with the depth of the shelf to be installed. To provide a 12 inch distance when leg 14 of tool 10a is longer such as for installing shelving at 16 or 20 inches in depth, an additional aperture, opening, or hole may be provided along leg 14 which is a length of 12 inches from end 12a to enable step 5 above (in the case of FIG. 1 such aperture may be provided by slot end 21 when 12 inches from end 12a). Although the steps are shown for marking or drilling sites along side and back walls for fastener elements from right to left corner and side wall, the steps may be performed in reverse from the left to right corner and the wall.

In the above installation example, tool 10b is described for locating sites for fixing shelf support hardware in the case of side wall end brackets with fastener elements that are horizontally aligned as a result of two sites along each side wall provided by holes 18 or 35. This is useful for shelf mounting hardware of ClosetMaid®. However, side wall end brackets of other manufacturers, such as Rubbermaid®, may have holes for fastener elements that are vertically aligned, rather than horizontal, when installed on a wall. To accommodate such end brackets, another leg 50 (or attachment) is attached to tool 10b at its end 31b perpendicular to leg 32, as shown in FIG. 10. Attachment of leg 50 to tool 10b may be by a grommet 54 having a hole 54a extending there through, such as described earlier, received through a hole 51 centered in leg 50 and hole 52 (FIG. 2) in wall 38c and a nut 54b threaded onto the threaded end of the grommet 54 extending through holes 51 and 52 (FIG. 12A) to fasten leg 50 to leg 32. Preferably, as shown in FIG. 2, a ½ inch deep by 2 inches notch 53 is provided in walls 38a and 38b at end 31b for leg 30. Such notch is optional and not shown in FIGS. 5 and 7. Leg 50 has vertical holes 56a and 56b for locating sites for fastening elements for shelf support hardware, e.g., side wall brackets, as shown in FIG. 11, of Rubbermaid®. Holes 56a are each 3¾ inches up and down, respectively, from the center hole 54; while holes 56b are 2¾ inches up and down from hole 51. Preferably holes 51 (and 52), 56a and 56b are each ⅜ inch in diameter and have a grommet and nut (and optional washer) described earlier, such as through a ¼ inch diameter hole may be drilled or marked on a side wall. Optionally, no grommet is provided in holes 56a and 56b and they may be of other diameter, such as ¼ inches.

Similarly, leg 50 may be attached to tool 10a of FIG. 1 at hole 58 in the same manner as to hole 52 of FIG. 2. When legs 32 and 33 extend along a right side wall and back wall respectively, from the right corner, one of the sites along the side wall is provided through hole 51 (via its respective grommet's central hole) and the other is through one of holes 56a or 56b (via its respective grommet's central hole) below hole 51. The particular hole 56a or 56b used depends on the distance between the two vertical fastener elements of the desired side wall bracket to be used, such as shown in FIG. 11 being of 3¾ or 2¾ inches apart from each other. When the tool 10b is flipped for use in a left corner, legs 32 and 33 extend along a left side wall and back wall respectively, from the left corner, and the holes 56a and 56b which were above hole 51 when the tool was located in the right corner is now below hole 51. In this manner, the holes 18 or 35 of tool 10a and 10b, respectively, of leg 14 or 32 are replaced by holes 51, 56a and 56b along vertical leg extension 50 of leg 14 or 32, to enable locating sites of holes along a side wall by such tool for use in providing vertical holes in the side wall for end brackets aligned with the depth of the shelf to be installed requiring vertically aligned fastener elements in such side wall. Leg 50 may be made of the aluminum, or plastic, such as PVC, and for example is 2 inches wide, 8 inches in length, and ⅜ inches thick. Leg 50 is also shown in FIG. 12 as a separate component which may be provided in a kit with one of tool 10a or 10b for adapting such tool with Rubbermaid® wire shelf installation hardware.

Thus, an adjustable template tool 10b for installing shelving, and also a plurality of tools 10a each for different depth shelf installation, are provided. In the first mode, such template tool 10a or 10b can locate sites for drilling holes for wire shelving wall end brackets of different manufacturers, such as ClosetMaid®, Rubbermaid®, Shulty® and other wire shelving end brackets along a left/right side walls. Optionally, leg 50 may be part of leg 14 of tool 10a or leg section 32b of tool 10b (or as an attachment thereto) having vertical holes 56a, 56b, and 51 (with or without horizontal holes 35) if needed by a shelf installer for the desired side wall bracket. Template tool 10a and 10b not only is operable in a first mode for locating sites for fixing shelf support hardware to walls, but if desired is operable in a second mode as a template tool for sites for mounting shelf support hardware along a back wall. Also, optionally level 20 or 24 may be removed from tool 10a and 10b, respectively, and such leveling provided by a level tool or leveling device, such as a torpedo level, which externally abuts the tool 10a or 10b when horizontal leveling of the tool is required with respect to wall(s). Thus, the entire installation of a wire shelf in a room or closet may be accomplished with a single template tool which is operable in both modes.

Although two holes 18 and 35 are shown for template tool 10a and 10b, respectively, the number of holes may be one, two, or more depending on the number of fasteners needed for desired side wall bracket to be used to capture the front portion or lip 3a of a shelf 3 (see FIGS. 13A and 13B). Also, although a single slot 22 (template tool 10a) and slot 33a (template tool 10b) are shown, such slot 22 or 33a may represent one two or more holes depending on the number of fasteners needed for a back wall bracket or clip.

From the foregoing description, it will be apparent that there has been provided a single template tool for installing shelving adaptable for installing different depth shelves, and also a plurality of template tools each for use in installing a different depth shelf. Variations and modifications in the herein described template tools and method of use will undoubtedly suggest themselves to those skilled in the art. Accordingly, the foregoing description should be taken as illustrative and not in a limiting sense.

The invention claimed is:

1. A template tool for locating sites for fixing to walls hardware for mounting a shelf comprising a first leg and a second leg, in which each of said first and second legs have one or more holes or openings, and said first leg and said second leg are perpendicular to each other along a bend locatable along a corner of two walls in which said first and second legs extend along different ones of said two walls from the corner to enable said one or more holes or openings along each of said first and second legs to align over locations of sites for fixing shelf support hardware to the walls.

2. The template tool according to claim 1 wherein said first leg comprises a first section, and a second section receiving into said first section and slidable along said first section to adjust the length of said first leg.

3. The template tool according to claim 2 wherein the length of said first leg from said bend to said one or more holes or openings of said first leg present along said first section is in accordance with the depth of a shelf to be supported by said shelf support hardware, in which said second section of said first leg represents said part of said first leg having said bend with respect to said second leg.

4. The template tool according to claim 3 further comprising means for releasably fixing said first section with respect to said second section in accordance with one of a plurality of different shelf depths.

5. The template tool according to claim 1 wherein said first leg is of a length from said bend to said one or more holes or openings of said first leg is in accordance with the depth of a shelf to be supported by said shelf support hardware.

6. The template tool according to claim 1 wherein said first leg and said second leg are of fixed lengths.

7. The template tool according to claim 1 wherein said shelf support hardware represents one or more brackets or clips and wall fastener elements for use therewith.

8. The template tool according to claim 1 wherein said one or more holes or openings along each of said first and second legs are aligned along a common plane with said one or more holes of the first leg horizontal with respect to the shelf to be mounted by said support hardware to said walls.

9. The template tool according to claim 1 wherein said one or more holes or openings of said first leg are two in number and aligned perpendicular with respect to the shelf to be mounted by said support hardware to said walls.

10. The template tool according to claim 1 wherein said first leg further comprises an aperture separate from said one or more holes or openings of said first leg, said aperture being a preset distance from one end of the first leg for use in successively locating sites for fixing shelf support hardware.

11. The template tool according to claim 1 wherein said first and second legs are compact in size to fit in a drill or tool box.

12. The template tool according to claim 1 wherein said first and second legs are aligned substantially horizontal along the two walls when said bend is located along a corner of the two walls in which said first and second legs extend along different ones of said two walls from the corner.

13. The template tool according to claim 1 further comprising a bubble level for horizontally leveling said first and second legs along said two walls when said bend is located along a corner of said two walls in which said first and second legs extend along different ones of said two walls from the corner.

14. The template tool according to claim 1 wherein one of said walls along which said second leg extends when said bend is located in the corner of two walls is a back wall, and the other of said walls along which said first leg extends is one of two side walls between which the shelf is received.

15. The template tool according to claim 1 wherein said first leg has an end opposite said bend, and an aperture at a preset distance from said end of said first leg, said tool is operable in a first mode along each of two corners formed by a back wall and two opposite side walls to locate sites along each of the side walls for fixing a shelf support brackets for supporting opposite ends of the shelf between said side walls, and said tool is operable in a second mode by aligning said end of said first leg and said aperture to successively locate each site along said back wall for fixing shelf mounting bracket or clip to support the back of the shelf.

16. The template tool according to claim 1 further comprising means for enabling manual adjustment of the length of the first leg.

17. The template tool according to claim 1 wherein said first leg further comprises a third leg having said one more of said holes or openings of said first leg, in which said one or more of said holes or openings of said first leg are at least two in number and vertically aligned when the tool is horizontally level and aligned over sites when said bend is located along a corner of two walls in which said first and second legs extend along different ones of said two walls from the corner.

18. A method for locating sites for wall fastener elements for installing shelving along two side walls and a back wall extending between said side walls comprising the steps of:

operating a tool in a first mode for locating sites along a first side wall for fastener elements for a side wall bracket in which said tool has a first leg with holes for said sites along said side wall, and a second leg perpendicular with said first leg having an opening aligned with a site along said back wall nearest said side wall;

operating said tool in a second mode for locating one or more sites along a back wall for fastener elements, in which each of said one or more sites along the back wall aligns with an opening in the first leg near one end of the first leg which is a predetermined distance from other end of the first end aligned with the nearest previous site aligned with the tool along the back wall, in which a first of the previous sites is the site aligned with the opening along the back wall when the template was operated in the first mode; and repeating said step for operating said tool in said first mode for a second side wall.

19. An apparatus for locating sites for fastener elements used for mounting shelf support hardware along two walls of a corner, said apparatus comprising:

first and second legs perpendicular to each other;

said first leg having a fixed or adjustable length in accordance with a depth of a shelf and one or more holes, in which when said first leg is of adjustable length said first leg comprises a first section coupled to said second leg and a second section, in which said first section and said second section are slidably disposed with respect to each other to adjust the length of said first leg and enable said one or more holes along said second section to vary in position along said first leg; and said second leg having at least one opening, in which said apparatus is locatable in a corner where one end of a shelf is to be installed such that the first and second legs are disposed along a side wall and a back wall, respectively, which extend from the corner, in which the position of the one or more holes of the first leg along the side wall is in accordance with a depth of a shelf to be installed and said second leg extends in a direction along the length of the shelf to be installed enabling said one or more holes and said at least one opening to align over sites along said side wall and said back wall, respectively, for fastener elements for mounting shelf support hardware along said side wall and said back wall.

20. The apparatus according to claim 19 further comprising mean for assuring that said one or more holes and said at least one opening are at least approximately level along a horizontal plane.

* * * * *